US012590861B2

(12) United States Patent
Dankers et al.

(10) Patent No.: US 12,590,861 B2
(45) Date of Patent: **\*Mar. 31, 2026**

(54) METHOD AND SYSTEM FOR DETECTING EVENTS IN A CONDUIT

(71) Applicant: Hifi Engineering Inc., Calgary (CA)

(72) Inventors: Arne Dankers, Calgary (CA); Seyed Ehsan Jalilian, Calgary (CA)

(73) Assignee: Hifi Engineering Inc., Alberta Calgary (CA)

( \* ) Notice: Subject to any disclaimer, the term of this patent is extended or adjusted under 35 U.S.C. 154(b) by 304 days.

This patent is subject to a terminal disclaimer.

(21) Appl. No.: 18/366,548

(22) Filed: Aug. 7, 2023

(65) Prior Publication Data

US 2023/0408366 A1      Dec. 21, 2023

Related U.S. Application Data

(63) Continuation of application No. 17/299,302, filed as application No. PCT/CA2019/051731 on Dec. 2, 2019, now Pat. No. 11,754,462.

(60) Provisional application No. 62/774,624, filed on Dec. 3, 2018.

(51) Int. Cl.
*G01M 3/38* (2006.01)
*E21B 47/117* (2012.01)
(52) U.S. Cl.
CPC ............. *G01M 3/38* (2013.01); *E21B 47/117* (2020.05)

(58) Field of Classification Search
CPC .......... G01M 3/00; G01M 3/38; E21B 47/117
See application file for complete search history.

(56) References Cited

U.S. PATENT DOCUMENTS

| | | | |
|---|---|---|---|
| 9,594,002 B2 | 3/2017 | Godfrey et al. | |
| 9,677,957 B2 * | 6/2017 | Dong ..................... | G01L 1/246 |
| 11,454,352 B2 | 9/2022 | Karabacak et al. | |
| 2019/0003499 A1 * | 1/2019 | Logan ..................... | G01M 3/38 |

FOREIGN PATENT DOCUMENTS

| | | |
|---|---|---|
| CA | 2790209 A1 | 8/2011 |
| CA | 2839764 C | 9/2019 |
| WO | 2009/056855 A1 | 5/2009 |
| WO | 2013/102252 A1 | 7/2013 |
| WO | 2016/183677 A1 | 11/2016 |
| WO | 2017/147679 A1 | 9/2017 |

\* cited by examiner

*Primary Examiner* — Nguyen Q. Ha
(74) *Attorney, Agent, or Firm* — D'Ambrosio & Menon, PLLC; Usha Menon

(57) ABSTRACT

There are described methods, systems, and computer-readable media for detecting events in a conduit. Multiple lengths of optical fiber positioned alongside a conduit are used to detect a signal. For each length of optical fiber, interferometric data is obtained from the detected signal. The interferometric data obtained for one length of optical fiber is compared to the interferometric data obtained for one or more other lengths of optical fiber. Based on the comparison, it is determined whether the signal originated from the conduit.

20 Claims, 7 Drawing Sheets

400

METHOD AND SYSTEM FOR DETECTING EVENTS IN A CONDUIT

CROSS REFERENCE TO RELATED APPLICATION(S)

This application is a continuation of U.S. patent application Ser. No. 17/299,302 filed on Jun. 2, 2021, which is a U.S. National Stage entry of PCT/CA2019/051731 filed on Dec. 2, 2019, which claims priority to provisional Patent Application No. 62/774,624 filed on Dec. 3, 2018, the contents of which are incorporated by reference herein.

FIELD OF THE DISCLOSURE

The present disclosure relates to methods and systems for detecting events, such as leaks, in a conduit, such as a pipeline or a wellbore.

BACKGROUND TO THE DISCLOSURE

Fiber optic cables are often used for distributed measurement systems in acoustic sensing applications. Pressure changes, due to sound waves for example, in the space immediately surrounding an optical fiber and that encounter the optical fiber cause dynamic strain in the optical fiber. Optical interferometry may be used to detect the dynamic strain along a segment of the fiber. Optical interferometry is a technique in which two separate light pulses, a sensing pulse and a reference pulse, are generated and interfere with each other. The sensing and reference pulses may, for example, be directed along an optical fiber that comprises fiber Bragg gratings. The fiber Bragg gratings partially reflect the pulses back towards an optical receiver at which an interference pattern is observed.

The nature of the interference pattern observed at the optical receiver provides information on the optical path length the pulses traveled, which in turn provides information on parameters such as the strain experienced by the segment of optical fiber between the fiber Bragg gratings. Information on the strain then provides information about the event that caused the strain.

It is important with optical fiber interferometry to reduce the occurrence of false positives. False positives are events that can be caused by either real ambient conditions or by system noise. In both cases, the processing algorithms may falsely identify an event where an event of interest in fact has not occurred. Examples of false positives due to real ambient conditions may include mistaking rain for a pipeline leak, or mistaking a noise spike in the system for an intrusion event. In a fiber optic system, various sources of system noise may include electrical noise (caused by 60 Hz power harmonics coupling onto optical measurements), vibrations near the interrogator affecting the measurement, laser noise, optical fading, micro-movements of the optical fiber being interpreted as major strain events, and speckle noise.

With false positives arising from ambient conditions, the main difficulty with any acoustic leak detection system is that it is difficult to distinguish the sound of a leak from other sounds. Other sounds occurring around a pipeline or a wellbore may be due to rivers, wind, rain, traffic, workers, machinery connected to the pipeline, wildlife, etc.

There therefore remains a need in the art for acoustic leak detection systems to better distinguish between actual leaks and false positives.

SUMMARY OF THE DISCLOSURE

According to a first aspect of the disclosure, there is provided a method of detecting events in a conduit, comprising: using multiple lengths of optical fiber positioned alongside a conduit to detect a signal; for each length of optical fiber, obtaining interferometric data from the detected signal; comparing the interferometric data obtained for one length of optical fiber to the interferometric data obtained for one or more other lengths of optical fiber; and determining, based on the comparison, whether the signal originated from the conduit.

Comparing the interferometric data may comprise determining when each length of optical fiber detected the signal; and determining whether the signal originated from the conduit may be further based on when each length of optical fiber detected the signal, and on relative positions of the lengths of optical fiber.

Determining whether the signal originated from the conduit may comprise determining that a first length of optical fiber detected the signal before one or more other lengths of optical fiber, wherein the first length of optical fiber is closer to the conduit than the one or more other lengths of optical fiber.

Comparing the interferometric data may comprise determining which length of optical fiber detected the signal having the greatest magnitude, and determining whether the signal originated from the conduit may be further based on which length of optical fiber detected the signal having the greatest magnitude, and on relative positions of the lengths of optical fiber.

Determining whether the signal originated from the conduit may comprise determining that a first length of optical fiber detected the signal having the greatest magnitude, wherein the first length of optical fiber is closer to the conduit than the one or more other lengths of optical fiber.

The multiple lengths of optical fiber may comprise a length of sensing optical fiber and one or more lengths of shield optical fiber. The length of sensing optical fiber may be positioned closer to the conduit than the one or more lengths of shield optical fiber. Thus, sounds originating from outside the "shield" formed by the lengths of shield fiber may be determined to be due to non-conduit-related sources, such as wind, rivers, traffic, etc. Sounds originating from inside the "shield" may be determined to be due to conduit-related sources, such as flow within the conduit, or leaks within the conduit.

The one or more lengths of shield optical fiber may be positioned radially equidistant from the conduit.

The length of sensing optical fiber may be attached to or positioned immediately adjacent the conduit.

The conduit may extend substantially parallel to a ground surface, and the one or more lengths of shield optical fiber may comprise first, second, and third lengths of shield optical fiber positioned respectively to the left of, the right of, and above the conduit.

The length of sensing optical fiber may be positioned alongside an underside of the conduit.

The length of sensing optical fiber may be positioned co-planar with the first and second lengths of shield optical fiber.

The multiple lengths of optical fiber may be positioned radially equidistant from the conduit.

The multiple lengths of optical fiber may comprise four lengths of shield optical fiber that, when viewed end-on, form corners of a square.

At least one of the multiple lengths of optical fiber may be spaced from the conduit.

The interferometric data may comprise one or more of acoustic data, strain data, and temperature data.

Using the multiple lengths of optical fiber to detect the signal may comprise: using an optical fiber interrogator to: transmit one or more light pulses along each of the multiple lengths of optical fiber; and receive reflections of the one or more light pulses from each of the multiple lengths of optical fiber.

Obtaining interferometric data from the detected signal may comprise: interrogating each length of optical fiber to obtain interferometric data from the length of optical fiber; and for each length of optical fiber, extracting parameter data from the interferometric data.

The interferometric data may be indicative of one or more of an acoustic signal, a strain signal, and a temperature signal. The method may further comprise detecting from the extracted parameter data one or more events, wherein comparing the interferometric data may comprise comparing the one or more events detected for one length of optical fiber to the one or more events detected for one or more other lengths of optical fiber. The parameter data may comprise, for example, one or more of a frequency centroid of the signal, a filtered baseline of the signal, a harmonic power of the signal, and a time-integrated spectrum flux of the signal.

According to a further aspect of the disclosure, there is provided a system for detecting events in a conduit, comprising: a conduit; multiple lengths of optical fiber positioned alongside the conduit; an optical fiber interrogator configured to interrogate each length of optical fiber so as to detect a signal; and one or more processors communicative with a memory having stored thereon computer program code configured when executed by the one or more processors to cause the one or more processors to perform a method comprising: for each length of optical fiber, obtaining interferometric data from the detected signal; and comparing the interferometric data obtained for one length of optical fiber with the interferometric data obtained for one or more other lengths of optical fiber; and determining, based on the comparison, whether the signal originated from the conduit.

The optical fiber interrogator may comprise the one or more processors and the memory.

Any of the features described above in connection with the first aspect of the disclosure may be used with the above-described system.

According to a further aspect of the disclosure, there is provided a computer-readable medium having stored thereon computer program code configured when executed by one or more processors to cause the one or more processors to perform a method comprising: for each of multiple lengths of optical fiber positioned alongside a conduit, obtaining interferometric data; comparing the interferometric data obtained for one length of optical fiber with the interferometric data obtained for one or more other lengths of optical fiber; and determining, based on the comparison, whether the signal originated from the conduit.

According to a further aspect of the disclosure, there is provided a method of forming a system for detecting events in a conduit, comprising: excavating a ground surface; positioning multiple lengths of optical fiber alongside a conduit interred beneath the ground surface, such that at least two of the lengths of optical fiber are radially equidistant from the conduit; and backfilling the ground surface.

The method may further comprise positioning a further length of optical fiber alongside the conduit during the backfilling.

The further length of optical fiber may be positioned, with the at least two of the lengths of optical fiber, radially equidistant from the conduit.

Any of the features described above in connection with the first aspect of the disclosure may be used with the above-described computer-readable medium.

BRIEF DESCRIPTION OF THE DRAWINGS

Embodiments of the disclosure will now be described in detail in conjunction with the accompanying drawings of which.

DETAILED DESCRIPTION OF EMBODIMENTS

The present disclosure seeks to provide improved methods and systems for detecting events in a conduit. While various embodiments of the disclosure are described below, the disclosure is not limited to these embodiments, and variations of these embodiments may well fall within the scope of the disclosure which is to be limited only by the appended claims.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

Figure 1A:
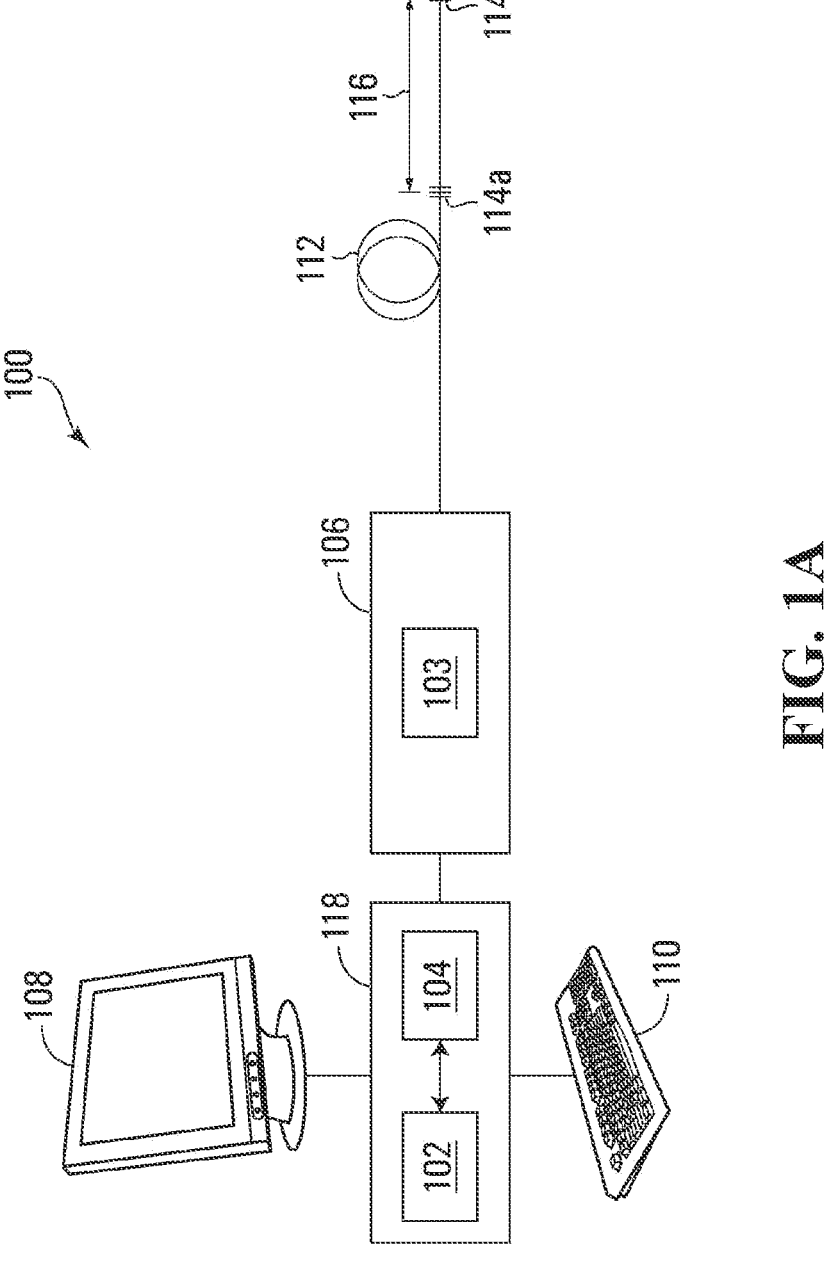
FIG. 1A is a block diagram of a system for determining whether an event has occurred from dynamic strain measurements, which includes an optical fiber with fiber Bragg gratings ("FBGs") for reflecting a light pulse, in accordance with an embodiment of the disclosure.

Referring now to FIG. 1A, there is shown one embodiment of a system 100 for performing interferometry using fiber Bragg gratings ("FBGs"). The system 100 comprises optical fiber 112, an interrogator 106 optically coupled to the optical fiber 112, and a signal processing device 118 that is communicative with the interrogator 106.

The optical fiber 112 comprises one or more fiber optic strands, each of which is made from quartz glass (amorphous $SiO2$). The fiber optic strands are doped with various elements and compounds (including germanium, erbium oxides, and others) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfmiCor® series multimode fibers.

The interrogator 106 generates the sensing and reference pulses and outputs the reference pulse after the sensing pulse. The pulses are transmitted along optical fiber 112 that comprises a first pair of FBGs. The first pair of FBGs comprises first and second FBGs 114a,b (generally, "FBGs 114"). The first and second FBGs 114a,b are separated by a certain segment 116 of the optical fiber 112 ("fiber segment 116"). The optical length of the fiber segment 116 varies in response to dynamic strain that the fiber segment 116 experiences.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in alternative embodiments (not depicted) any number of FBGs 114 may be on the fiber 112, and time division multiplexing (TDM) (and, optionally, wavelength division multiplexing (WDM)) may be used to simultaneously obtain measurements from them. If two or more pairs of FBGs 114 are used, any one of the pairs may be tuned to reflect a different center wavelength than any other of the pairs. Alternatively, a group of multiple FBGs 114 may be tuned to reflect a different center wavelength to another group of multiple FBGs 114, and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the interrogator 106. When different pairs of the FBGs 114 are not tuned to different center wavelengths, TDM is sufficient.

The interrogator 106 emits laser light with a wavelength selected to be identical or sufficiently near the center wavelength of the FBGs 114, and each of the FBGs 114 partially reflects the light back towards the interrogator 106. The timing of the successively transmitted light pulses is such that the light pulses reflected by the first and second FBGs 114a,b interfere with each other at the interrogator 106, which records the resulting interference signal. The strain that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 118 includes a processor 102 and a non-transitory computer-readable medium 104 that are communicatively coupled to each other. An input device 110 and a display 108 interact with control module 250. The computer-readable medium 104 has stored on it program code to cause control module 250 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. Control module 250 may apply to the output signal a low pass filter with a cut-off frequency of 20 Hz, to isolate the vibration portion of the output signal from the acoustics portion of the output signal. Analogously, to isolate the acoustics portion of the output signal from the vibration portion, control module 250 may apply a high-pass filter with a cut-off frequency of 20 Hz. Control module 250 may also apply more complex signal processing methods to the output signal; example methods include those described in PCT application PCT/CA2012/000018 (publication number WO 2013/102252), the entirety of which is hereby incorporated by reference.

Figures 1B, 1C:
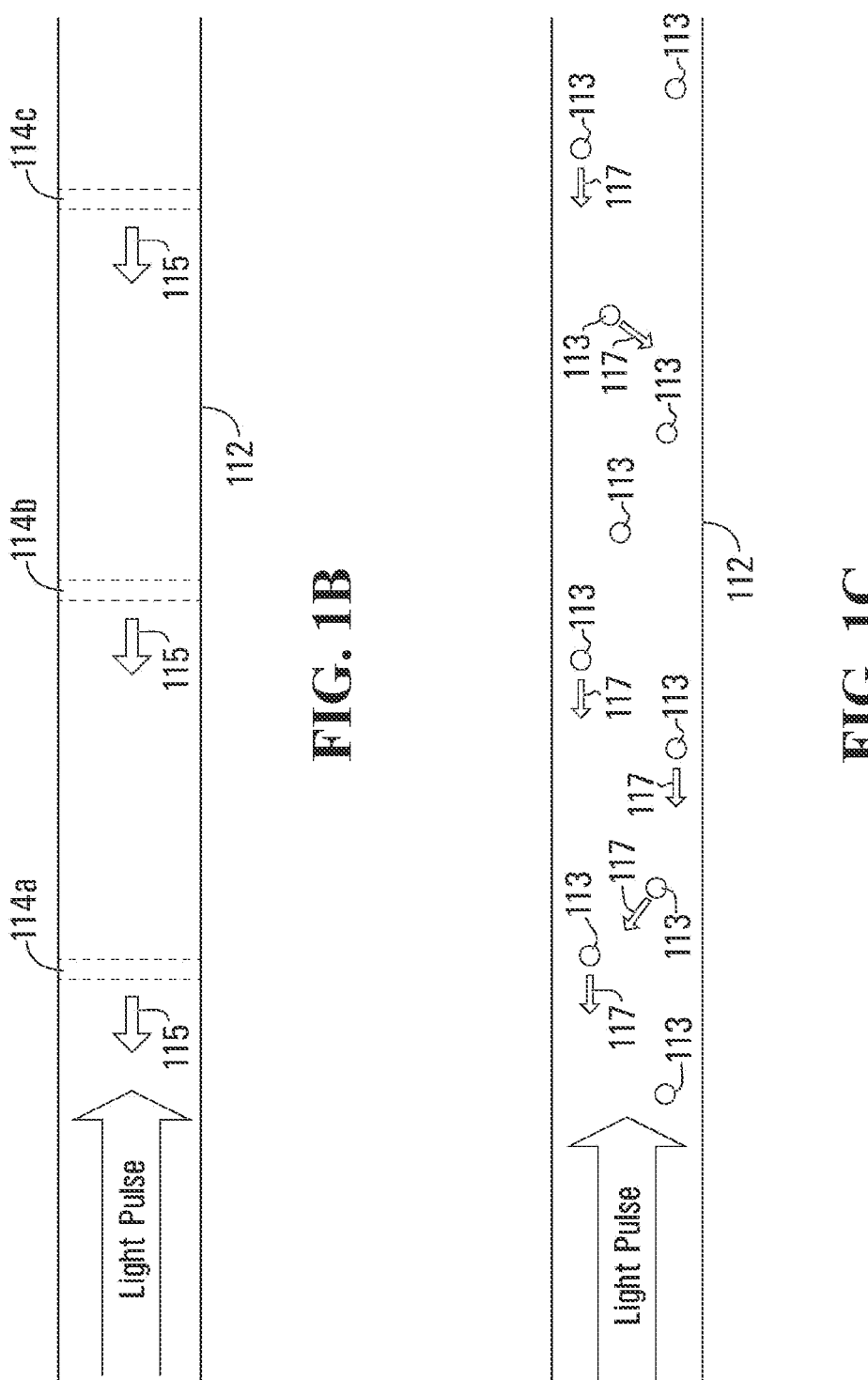
FIG. 1B is a schematic diagram that depicts how the FBGs reflect a light pulse.
FIG. 1C is a schematic diagram that depicts how a light pulse interacts with impurities in an optical fiber that results in scattered laser light due to Rayleigh scattering, which is used for distributed acoustic sensing ("DAS")

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect strain along the fiber 112 occurring further from the interrogator 106 than the second FBG 114b. For example, in the embodiment of FIG. 1B, a portion of the sensing pulse not reflected by the first and second FBGs 114a,b can reflect off the third FBG 114c, and a portion of the reference pulse not reflected by the first FBG 114*a* can reflect off the second FBG 114*b*, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference (Θ) is as follows:

$$\theta = 2\pi n L/\lambda,$$

where n is the index of refraction of the optical fiber, L is the physical path length of the fiber segment 116, and λ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain" refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 μHz, is referred to as "sub-Hz strain".

One conventional way of determining ΔnL is by using what is broadly referred to as distributed acoustic sensing ("DAS"). DAS involves laying the fiber 112 through or near a region of interest and then sending a coherent laser pulse along the fiber 112. As shown in FIG. 1C, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back-scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits less light back towards the optical receiver 103 than using the FBGs 114.

DAS accordingly uses Rayleigh scattering to estimate the magnitude, with respect to time, of the strain experienced by the fiber during an interrogation time window, which is a proxy for the magnitude of the vibration or acoustics emanating from the region of interest. In contrast, the embodiments described herein measure dynamic strain using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of between 0.1% and 5%. The use of FBG-based interferometry to measure dynamic strain offers several advantages over DAS, in terms of optical performance.

Figure 2:
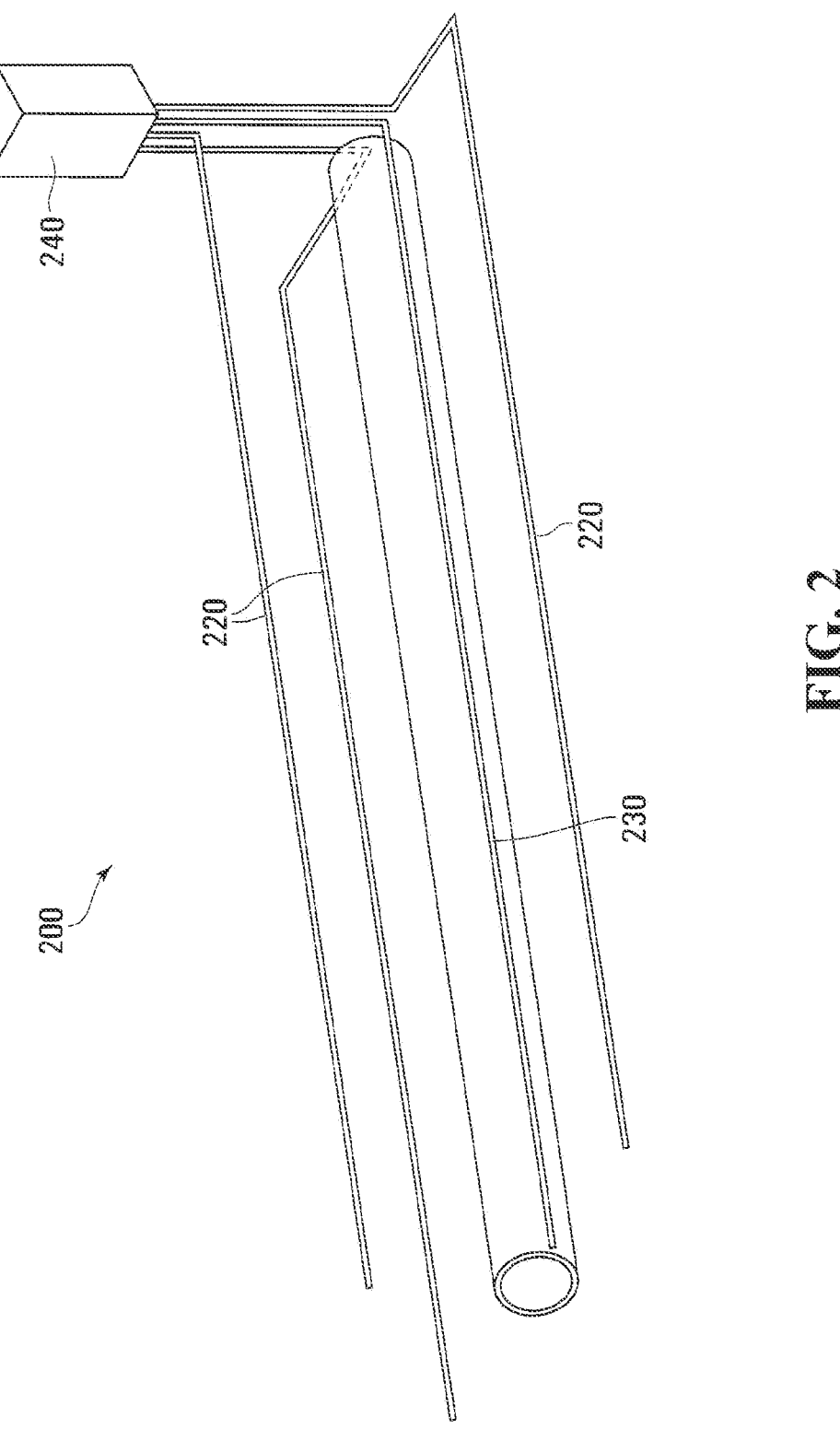
FIG. 2 is a schematic diagram of an optical interrogation system in accordance with an embodiment of the disclosure.

Referring now to FIG. 2, there is shown an optical interrogation system 200 that may be used to detect events in a pipeline, in accordance with an embodiment of the disclosure. FIG. 2 shows a pipeline 210 alongside which are provided a sensing optical fiber 230 and multiple shield optical fibers 220. Shield optical fibers 220 are positioned spaced apart and preferably equidistant from pipeline 210, whereas sensing optical fiber 230 is attached directly to pipeline 210 using any of various means known in the art. In some embodiments, sensing optical fiber 230 is placed immediately beside or in very close proximity to pipeline 210. In some embodiments, each optical fiber may comprise multiple individual interconnected lengths of optical fibers. In some embodiments, optical fibers 220 and 230 may be separate portions of a single optical fiber looping back onto itself one or more times.

Each optical fiber is optically coupled to an interrogator 240. Interrogator 240 is configured to interrogate optical fibers 220,230 using optical fiber interferometry, as described above. Interrogator 240 is communicatively coupled to a control module (not shown). The control module comprises one or more processors and one or more memories comprising computer program code executable by the one or more processors and configured, when executed by the one or more processors, to cause the one or more processors to process phase data obtained by interrogator 240 from interferences between light pulses transmitted along optical fibers 220,230. In some embodiments, the control module may be comprised within interrogator 240 such that interrogator 240 may perform the functions of the control module.

Figure 3:
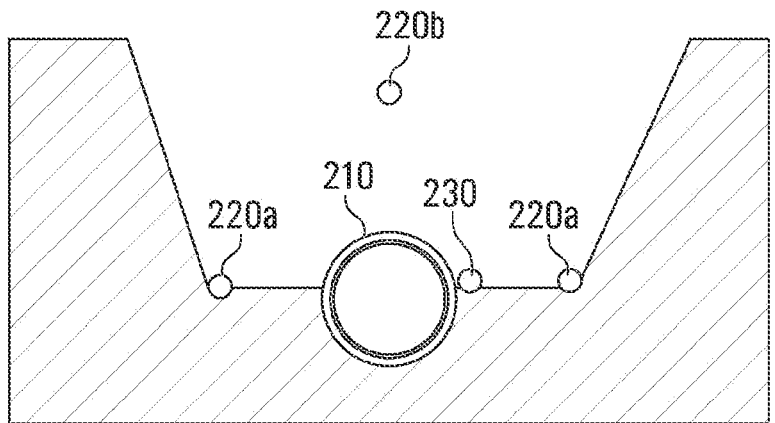
FIG. 3 is a cross-sectional view of the optical interrogation system of FIG. 2.
Figure 4:
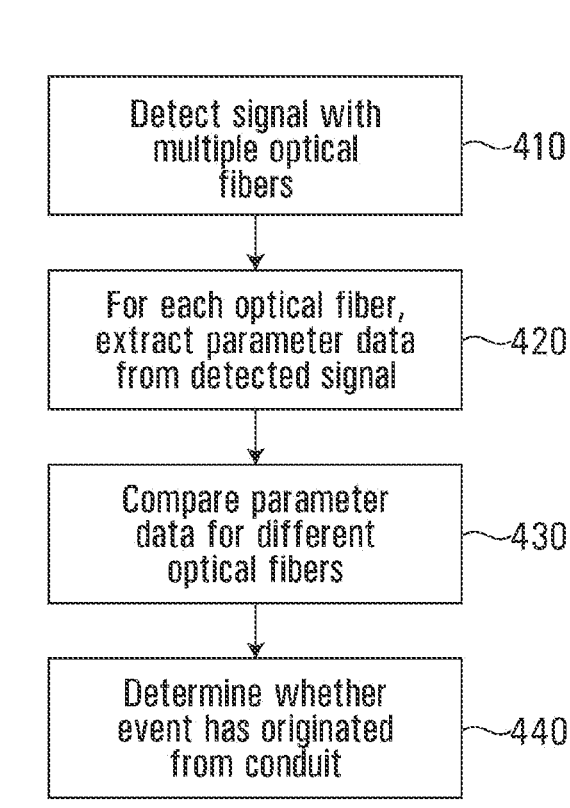
FIG. 4 is a flow diagram of a method of detecting events in a conduit, in accordance with an embodiment of the disclosure.

FIG. 3 shows a cross-section of system 200 of FIG. 2. In order to position optical fibers 220,230 relative to pipeline 210, the ground surface is first excavated to remove a volume of earth. Shield optical fibers 220*a* are then positioned in their desired locations, and sensing optical fiber 230 is attached to pipeline 210 using appropriate means. The volume of earth is then backfilled. Before completely backfilling the excavated portion of earth, shield optical fiber 220*b* is positioned in the desired location, such that shield optical fibers 220*a*,220*b* are generally equidistant from pipeline 210. In alternative embodiments, sensing optical fiber 230 may be attached, or placed close, to an underside of pipeline 210, as leaks will generally occur in the bottommost quarter of pipeline 210. In some cases, for example when the pipeline passes beneath a river or a road, the pipeline and optical fibers may be positioned using horizontal boring and/or directional drilling.

There will now be described a method 400 of detecting leaks in a conduit (for example pipeline 210 of FIG. 2), in accordance with an embodiment of the disclosure. Method 400 represents merely one exemplary embodiment, and variations to the method may be made without departing from the scope of the disclosure. For example, the order of the operations may be modified, or additional operations may be added to the flow of operations.

At block 410, shield optical fibers 220 and sensing optical fiber 230 are used to detect a signal (e.g. an acoustic signal, a strain signal, or a temperature signal). In particular, interrogator 240 is used to interrogate each optical fiber and obtain interferometric data therefrom, as described above. The interferometric data is indicative of one or more of an acoustic signal, a strain signal, and a temperature signal. At block 420, for each optical fiber 220,230, the control module processes the interferometric data to extract parameter data from the interferometric data. The parameter data may comprise, for example, one or more of: a magnitude of the signal, a frequency centroid of the signal, a filtered baseline of the signal, a harmonic power of the signal, and a time-integrated spectrum flux of the signal, although the parameter data may comprise other types of data. Suitable methods of parameter extraction are described in more detail in international patent publication WO 2017/147679, the contents of which is hereby incorporated by reference in its entirety.

Once the parameter data has been extracted, at block 430 the control module compares the parameter data obtained from sensing optical fiber 230 with parameter data obtained from shield optical fibers 220. There are various ways in which the control module may compare the parameter data. For example, the RMS magnitude of a parameter (such as strain, acoustics, or temperature) for one optical fiber may be compared to the RMS magnitude of the parameter for another optical fiber. Alternatively, a cross-correlation of the RMS magnitude of a parameter for one optical fiber with the RMS magnitude of the parameter for another optical fiber may be determined. In some embodiments, the control module may detect from the extracted parameter data one or more events (for example using the methods described in WO 2017/147679). One or more events detected for one length of optical fiber may then be compared to one or more events detected for one or more other lengths of optical fiber.

At block 440, based on the comparison, the control module determines whether an event has occurred within pipeline 210 and, in particular, whether the detected signal originated from pipeline 210. For example, if the comparison at block 430 indicates that the RMS magnitudes of the parameter or parameters obtained for sensing fiber 230 are sufficiently greater than the RMS magnitudes of the parameter or parameters obtained for shield fibers 220, then the control module may determine that an event, such as a leak, has occurred in pipeline 210. If on the other hand the comparison at block 440 indicates that the difference between the RMS magnitudes of the parameter or parameters for sensing fiber 230 is sufficiently lower than the RMS magnitudes of the parameter or parameters obtained for shield fibers 220, then the control module may determine that the source of the signal is external to pipeline 210. In such a case, it is likely that the signal may be associated with a false positive, and can be ignored.

Figure 5:
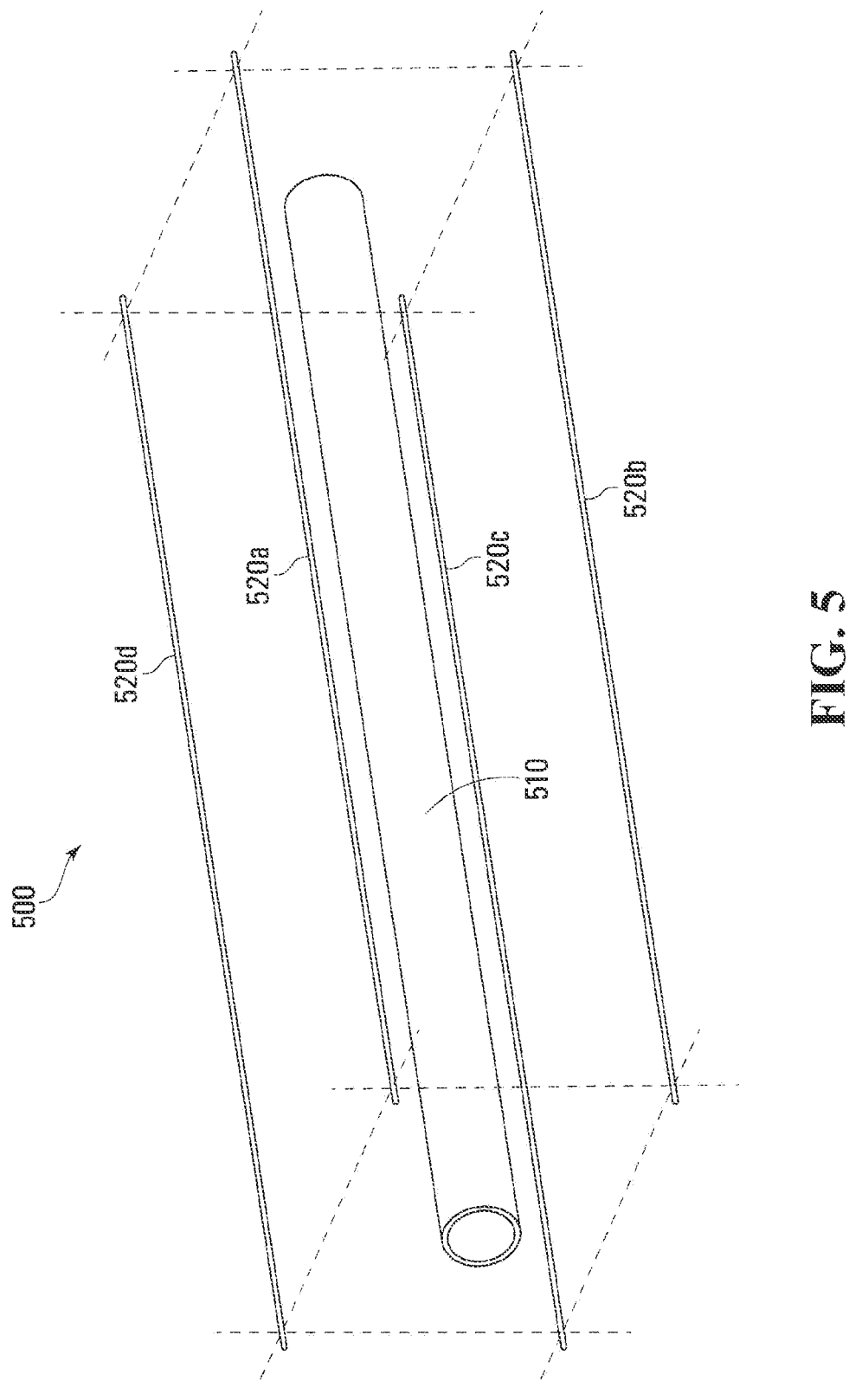
FIG. 5 is a schematic diagram of another optical interrogation system in accordance with an embodiment of the disclosure.

Turning to FIG. 5, there is shown another embodiment of a system 500 for detecting events in a conduit. System 500 comprises a pipeline 510 extending in a direction roughly parallel to the ground, and multiple shield optical fibers 520 positioned alongside pipeline 510. Shield optical fibers 520 are positioned radially equidistant from pipeline 510, and when viewed end-on form the corners of a square. In the present embodiment, shield optical fibers 520 are positioned no more than one metre from pipeline 510, although in other embodiments other suitable distances may separate shield optical fibers 520 from pipeline 510. Although not shown in FIG. 5, shield optical fibers 520 are coupled to an optical fiber interrogator, in same manner as the optical fibers in system 200.

Figure 6:
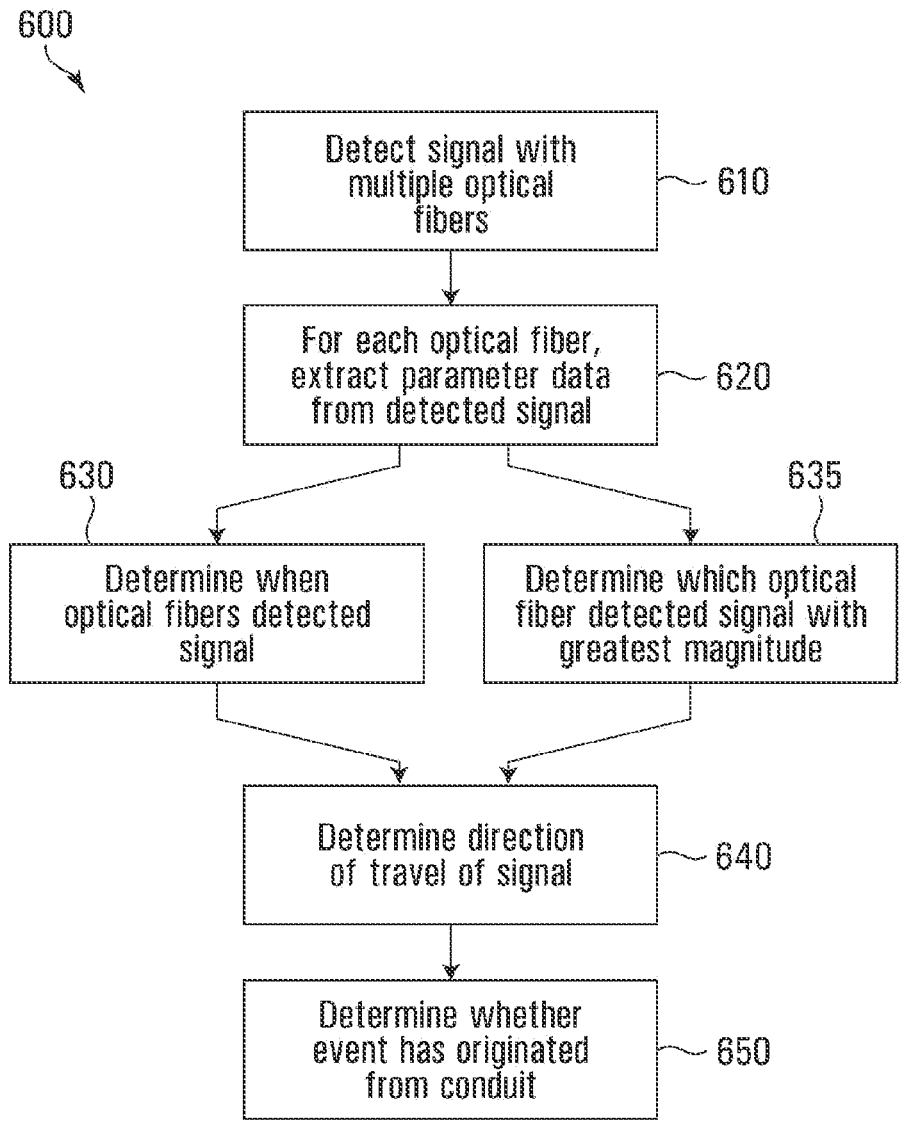
FIG. 6 is a flow diagram of a method of detecting events in a conduit, in accordance with an embodiment of the disclosure.

In order for system 500 to determine whether an event has occurred in pipeline 510, the directionality of a signal may be determined, as now described. In particular, FIG. 6 shows a method 600 of detecting leaks in a conduit (for example pipeline 510 of FIG. 5), in accordance with an embodiment of the disclosure. Method 600 represents merely one exemplary embodiment, and variations to the method may be made without departing from the scope of the disclosure. For example, the order of the operations may be modified, or additional operations may be added to the flow of operations.

At block 610, shield optical fibers 520 are used to detect a signal (e.g. an acoustic signal, a strain signal, or a temperature signal). In particular, the interrogator is used to interrogate each shield optical fiber 520 and obtain interferometric data therefrom, as described above. At block 620, for each shield optical fiber 520, the control module processes the interferometric data to extract parameter data from the interferometric data, as described above.

In order to determine the directionality of the signal, at block 630, the control module may determine when shield optical fibers 520 detected the signal. This may be determined, for example, on the basis of when each shield optical fiber 520 obtained the interferometric data associated with the signal. Determining when each shield optical fiber 520 detected the signal may comprise, for example, using cross-correlation.

Alternatively, or in addition, at block 635 the control module may determine which shield optical fiber 520 detected the signal with the greatest magnitude. For any given shield optical fiber 520, this may be determined, for example, on the basis of the magnitude of the parameter data associated with the signal. Determining which shield optical fiber 520 detected the signal with the greatest magnitude may comprise, for example, comparing, to a baseline threshold, the ratio of the magnitude of the signal recorded on one optical fiber to the magnitude of the signal recorded on another optical fiber.

At block 640, the control module determines, based on when each shield optical fiber 520 detected the signal, or based on which shield optical fiber 520 detected the signal with the greatest magnitude, and based the relative positions of shield optical fibers 520, whether the signal originated from pipeline 510. For example, if the source of the signal is located to the right of pipeline 510, then the signal will first be detected by shield optical fibers 520*a* and 520*b*, and subsequently shield optical fibers 520*c* and 520*d*. Similarly, the signal will be detected with the greatest magnitude by shield optical fibers 520*a* and 520*b* (shield optical fibers 520*c* and 520*d* will detect the signal as having a lower magnitude). Conversely, if the source of the signal is located to the left of pipeline 510, then the signal will first be detected by shield optical fibers 520*c* and 520*d*, and subsequently by shield optical fibers 520*a* and 520*b*. Similarly, the signal will be detected with the greatest magnitude by shield optical fibers 520*c* and 520*d* (shield optical fibers 520*a* and 520*b* will detect the signal as having a lower magnitude). If the source of the signal is located within pipeline 510 (for example as the result of a leak), then the signal will be detected by shield optical fibers 520*a-b* at roughly the same time, and the signal will be detected by each shield optical fiber 520 as having roughly the same magnitude.

It will be recognized that the method of determining directionality of the signal may also be used with system 200 shown in FIG. 2.

When comparing data from one length of fiber to data from another length of fiber (for example when performing cross-correlation, comparing RMS magnitudes, or when comparing events as described above), it may be advantageous to divide the data into multiple frames or windows, for each length of optical fiber. Each window has a certain duration. Preferably, comparing data from one length of fiber to data from another length of fiber may comprise comparing the data for corresponding frames or windows, that is for pairs of windows that correspond to the same fixed length of time.

While the disclosure has been described in connection with specific embodiments, it is to be understood that the disclosure is not limited to these embodiments, and that alterations, modifications, and variations of these embodiments may be carried out by the skilled person without departing from the scope of the disclosure. For example, in some embodiments, more than two optical fibers may be used to interrogate the same conduit, for improved confidence in the overall interferometric data and even further reduction in the incidence of false positives.

It is furthermore contemplated that any part of any aspect or embodiment discussed in this specification can be implemented or combined with any part of any other aspect or embodiment discussed in this specification.

The invention claimed is:

1. A method of detecting events in a conduit, comprising:
using multiple lengths of optical fiber positioned alongside the conduit to detect a signal, wherein each length of optical fiber comprises at least one pair of fiber Bragg gratings (FBGs), and wherein detecting the signal comprises, for each length of optical fiber, reflecting one or more light pulses off the at least one pair of FBGs;
for each length of optical fiber, obtaining interferometric data from the detected signal;
comparing the interferometric data obtained for one length of optical fiber to the interferometric data obtained for one or more other lengths of optical fiber, wherein comparing the interferometric data comprises determining when each length of optical fiber detected the signal; and
determining, based on i) the comparison, ii) when each length of optical fiber detected the signal, and iii) on relative positions of the lengths of optical fiber, whether the signal originated from the conduit, wherein determining whether the signal originated from the conduit comprises determining that a first length of optical fiber detected the signal before one or more other lengths of optical fiber, and wherein the first length of optical fiber is closer to the conduit than the one or more other lengths of optical fiber.

2. The method of claim 1, wherein the multiple lengths of optical fiber comprise a length of sensing optical fiber and one or more lengths of shield optical fiber, wherein the length of sensing optical fiber is positioned closer to the conduit than the one or more lengths of shield optical fiber.

3. The method of claim 2, wherein the one or more lengths of shield optical fiber are positioned radially equidistant from the conduit.

4. The method of claim 2, wherein the length of sensing optical fiber is attached to or positioned immediately adjacent the conduit.

5. The method of claim 2, wherein the conduit extends substantially parallel to a ground surface, and wherein the one or more lengths of shield optical fiber comprise first, second, and third lengths of shield optical fiber positioned respectively to the left of, the right of, and above the conduit.

6. The method of claim 2, wherein the length of sensing optical fiber is positioned alongside an underside of the conduit.

7. The method of claim 5, wherein the length of sensing optical fiber is positioned co-planar with the first and second lengths of shield optical fiber.

8. The method of claim 1, wherein the multiple lengths of optical fiber are positioned radially equidistant from the conduit.

9. The method of claim 8, wherein the multiple lengths of optical fiber comprise four lengths of shield optical fiber that, when viewed end-on, form corners of a square.

10. The method of claim 1, wherein at least one of the multiple lengths of optical fiber is spaced from the conduit.

11. The method of claim 1, wherein the interferometric data comprises one or more of acoustic data, strain data, and temperature data.

12. The method of claim 1, wherein using the multiple lengths of optical fiber to detect the signal comprises:
using an optical fiber interrogator to:
transmit one or more light pulses along each of the multiple lengths of optical fiber; and
receive reflections of the one or more transmitted light pulses from each of the multiple lengths of optical fiber, wherein, for each length of optical fiber, the one or more transmitted light pulses are reflected by the at least one pair of FBGs.

13. The method of claim 1, wherein obtaining interferometric data from the detected signal comprises:
interrogating each length of optical fiber to obtain interferometric data from the length of optical fiber; and
for each length of optical fiber, extracting parameter data from the interferometric data.

14. The method of claim 13, wherein the interferometric data is indicative of one or more of an acoustic signal, a strain signal, and a temperature signal, and wherein the method further comprises detecting from the extracted parameter data one or more events, wherein comparing the interferometric data comprises comparing the one or more events detected for one length of optical fiber to the one or more events detected for one or more other lengths of optical fiber.

15. The method of claim 14, wherein the parameter data comprises one or more of a frequency centroid of the signal, a filtered baseline of the signal, a harmonic power of the signal, and a time-integrated spectrum flux of the signal.

16. A system for detecting events in a conduit, comprising:
the conduit;
multiple lengths of optical fiber positioned alongside the conduit, wherein each length of optical fiber comprises at least one pair of fiber Bragg gratings (FBGs);
an optical fiber interrogator configured to detect a signal by interrogating each length of optical fiber by transmitting one or more light pulses along each length of optical fiber and receiving reflections of the one or more light pulses reflected by the at least one pair of FBGs; and
one or more processors communicative with a memory having stored thereon computer program code configured when executed by the one or more processors to cause the one or more processors to perform a method comprising:
for each length of optical fiber, obtaining interferometric data from the detected signal; and
comparing the interferometric data obtained for one length of optical fiber with the interferometric data obtained for one or more other lengths of optical fiber, wherein comparing the interferometric data comprises determining when each length of optical fiber detected the signal; and
determining, based on i) the comparison, ii) when each length of optical fiber detected the signal, and iii) on relative positions of the lengths of optical fiber, whether the signal originated from the conduit, wherein determining whether the signal originated from the conduit comprises determining that a first length of optical fiber detected the signal before one or more other lengths of optical fiber, and wherein the first length of optical fiber is closer to the conduit than the one or more other lengths of optical fiber.

17. A method of detecting events in a conduit, comprising:

using multiple lengths of optical fiber positioned alongside the conduit to detect a signal, wherein each length of optical fiber comprises at least one pair of fiber Bragg gratings (FBGs), and wherein detecting the signal comprises, for each length of optical fiber, reflecting one or more light pulses off the at least one pair of FBGs;

for each length of optical fiber, obtaining interferometric data from the detected signal;

comparing the interferometric data obtained for one length of optical fiber to the interferometric data obtained for one or more other lengths of optical fiber, wherein comparing the interferometric data comprises determining which length of optical fiber detected the signal having the greatest magnitude; and determining, based on i) the comparison, ii) which length of optical fiber detected the signal having the greatest magnitude, and iii) on relative positions of the lengths of optical fiber, whether the signal originated from the conduit.

18. The method of claim 17, wherein determining whether the signal originated from the conduit comprises determining that a first length of optical fiber detected the signal having the greatest magnitude, and wherein the first length of optical fiber is closer to the conduit than the one or more other lengths of optical fiber.

19. A system for detecting events in a conduit, comprising:

the conduit;

multiple lengths of optical fiber positioned alongside the conduit, wherein each length of optical fiber comprises at least one pair of fiber Bragg gratings (FBGs);

an optical fiber interrogator configured to detect a signal by interrogating each length of optical fiber by transmitting one or more light pulses along each length of optical fiber and receiving reflections of the one or more light pulses reflected by the at least one pair of FBGs; and one or more processors communicative with a memory having stored thereon computer program code configured when executed by the one or more processors to cause the one or more processors to perform a method comprising:

for each length of optical fiber, obtaining interferometric data from the detected signal; and comparing the interferometric data obtained for one length of optical fiber with the interferometric data obtained for one or more other lengths of optical fiber, wherein comparing the interferometric data comprises determining which length of optical fiber detected the signal having the greatest magnitude; and determining, based on i) the comparison, ii) which length of optical fiber detected the signal having the greatest magnitude, and iii) on relative positions of the lengths of optical fiber, whether the signal originated from the conduit.

20. The system of claim 19, wherein determining whether the signal originated from the conduit comprises determining that a first length of optical fiber detected the signal having the greatest magnitude, and wherein the first length of optical fiber is closer to the conduit than the one or more other lengths of optical fiber.

* * * * *